April 17, 1956     L. LIVINGSTON     2,741,848
COMBINATION MICROMETER CALIPER
Filed Oct. 21, 1952
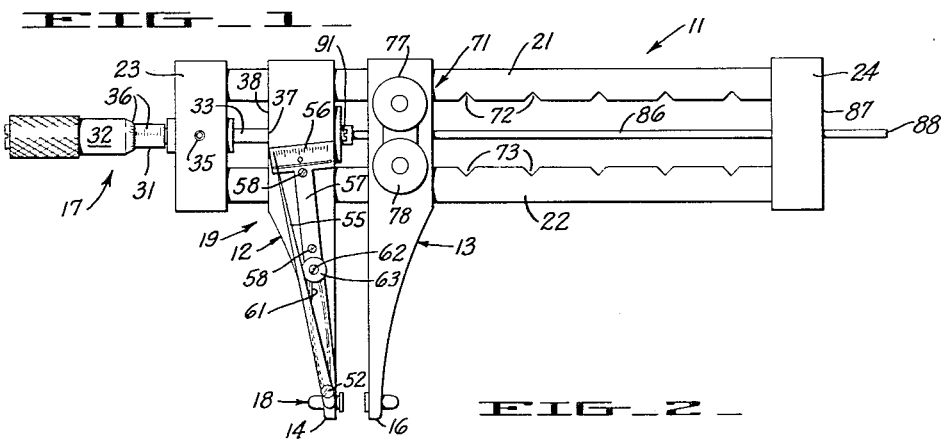
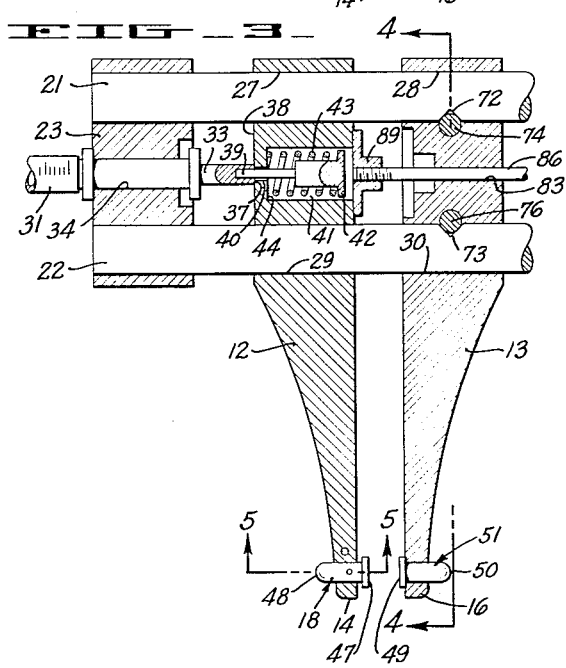
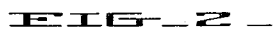
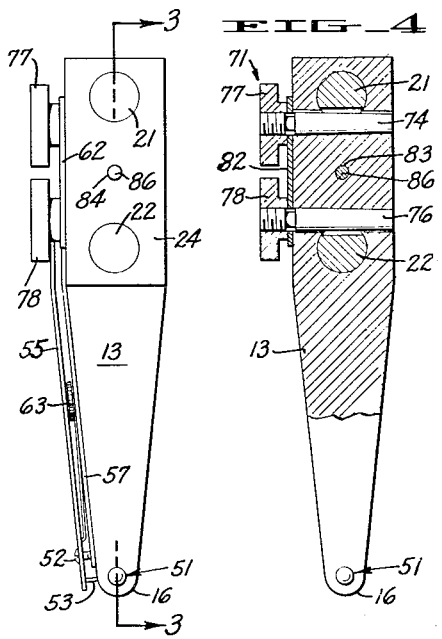
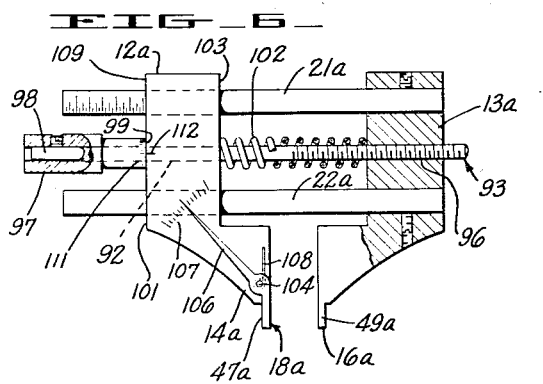
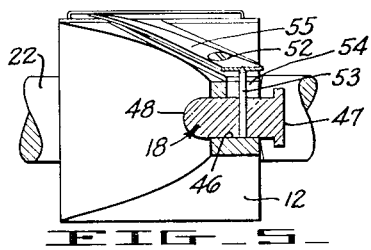
INVENTOR.
Leo Livingston
BY Manfred M. Warren
His Attorney United States Patent Office 2,741,848
Patented Apr. 17, 1956

2,741,848

COMBINATION MICROMETER CALIPER

Leo Livingston, San Francisco, Calif.

Application October 21, 1952, Serial No. 315,920

4 Claims. (Cl. 33—167)

The invention relates to precision measuring calipers of the micrometer type and more particularly to micrometer calipers adapted to take both inside and outside measurements.

An object of the present invention is to provide a combination micrometer caliper of the character described which is designed for the taking of both inside and outside work measurements and which, in connection with each of such operations, applies a constant pre-determined force of contact between the caliper and the work surfaces being measured so as to provide a precise measurement without dependence in any way upon the feel or tactile sense of the user, and being of a design permitting its use for the gauging of parts which may be quickly and easily inserted into and removed from the gauge to rapidly determine precise variation of such parts from standard.

Another object of the present invention is to provide a combination micrometer caliper of the character described, which is readily adjustable for measuring a wide range of both inside and outside work dimensions and in which the adjusting means for obtaining various ranges of measurements is designed in a manner permitting normal wear without interfering with the precise measuring qualities of the instrument.

A still further object of the present invention is the provision of a combination micrometer caliper of the character above which employs a conventional micrometer vernier head cooperating with the caliper structure and dimensions to provide direct readings for both inside and outside measurements without calculations and which may be instantly and easily changed over from inside to outside mensuration and vice versa.

Yet another object of the present invention is to provide a micrometer caliper having an improved and more precise connection between the micrometer vernier and the caliper arm moved thereby and providing a depth measuring feeler utilizing such connection to obtain an axial displacement of the feeler free from rotation of the feeler.

Another object of the present invention is to provide a combination micromter caliper formed of a minimum number of simple and easily replaceable parts combined into a sturdy assembly affording the aforesaid precision while still providing a long service life under shop conditions.

The invention possesses other objects and features of advantage, some of which, with the foregoing, will be set forth in the following descriptions of the preferred form of the invention which is illustrated in the drawing accompanying and forming part of the specification. It is to be understood, however, that variations in the showing made by the said drawing and description may be adapted within the scope of the invention as set forth in the claims.

Referring to said drawing:

Figure 1 is a side elevational view of a micrometer caliper constructed in accordance with the present invention.

Figure 2 is an end elevational view on an enlarged scale of the micrometer caliper of Figure 1.

Figure 3 is a fragmentary longitudinal sectional view of a portion of the micrometer caliper and is taken substantially on the plane of line 3—3 of Figure 2.

Figure 4 is a cross sectional view taken substantially on the plane of line 4—4 of Figure 3.

Figure 5 is a fragmentary sectional view on an enlarged scale taken substantially on the plane of line 5—5 of Figure 3.

Figure 6 is a side elevational view of a modified form of micrometer caliper with portions being broken away and shown in section for clarity of illustrations.

The combination micrometer caliper of the present invention, and as illustrated in the accompanying drawing, consists briefly of an elongated guide way 11 having a pair of caliper arms 12 and 13 mounted for movement therealong, the arms being arranged to project laterally from the guide way to provide outstanding caliper ends 14 and 16 for engagement with the work to be measured, and micrometer vernier means 17 for indicating the relative distance between the caliper ends together with a relatively displaceable work feeler element 18 carried by one of the ends and indicator means 19 for showing the displacement of the element 18 relative to its supporting caliper end.

The guide way 11 is here provided by a frame including a pair of elongated guide rods 21 and 22, preferably of circular cross-section, secured in parallel spaced relation at their opposite ends in mounting blocks 23 and 24. The caliper arms 12 and 13 are slidably journalled for reciprocation along the guide rods 21 and 22 by parallel bores 27, 28, 29, and 30 provided in the arms, and the latter are formed to project laterally from rod 22 to locate the caliper ends 14 and 16 in spaced relation to the rod by a distance sufficient for measuring the outside diameter of a cylindrical shaft at the largest opening between the caliper arm ends. In other words, if the maximum spacing possible between the caliper ends is 6", the arms should be proportioned to extend at least 3" beyond the guide rods 21 and 22. In order to facilitate insertion of the caliper ends 14 and 16 between confronting work surfaces for determining inside dimensions, the arms are tapered toward their ends 14 and 16, as may best be seen in Figures 2 and 3 of the drawing.

The micrometer vernier means 17 may be, and preferably is, provided in the form of a standard micrometer head, including a fixed barrel 31, a surrounding thimble 32 threaded thereon, and a stem 33 secured to the thimble and projecting from the end of the barrel. When the thimble 32 is rotated relative to the barrel 31, the stem 33 is advanced or retracted through the barrel in a direction depending upon the direction of rotation of the thimble. As here shown, the micrometer head is mounted in parallel axial alignment with the guide rods 21 and 22 by the provision in mounting block 23 of a bore 34 formed to receive the micrometer barrel 31, the latter being held in desired position therein against rotative and axial displacement by means of a set screw 35 provided in the block 23.

While the primary purpose of the micrometer vernier means 17 is to indicate the relative position of the arm 12 on the guide way 11 by means of the usual calibrations 36 inscribed on the barrel and thimble, the vernier means may also be employed for displacing the arm 12 along the guide way. This convenience is here afforded by the provision of a structure wherein the end face of the stem 33 is held in constant engagement with the confronting side 38 of arm 12 under a uniform contacting pressure for all measurements. The structure includes a pin 39 secured to the end of the stem and extending coaxially therefrom through an opening 40 provided through the side 38 of the arm and into an interior chamber 41 provided in the arm. An enlarged head 42 is formed on the pin within the chamber and provides a rest for one end of a helical spring 43 compressed between the head 42 and the end 44 of the chamber adjacent the opening so as to constantly draw the end face 37 of the stem against the confronting arm side 38 with a uniform and unvarying pressure for all measurements.

The work feeler element is here provided in the form of a pin journalled for longitudinal reciprocation in a bore 46 formed through the caliper end 14 for axial reciprocation of the pin toward and away from the other caliper end 16, whereby the end faces 47 and 48 of the pin 18 cooperate with confronting and antipodal faces 49 and 50 provided on the other caliper arm end 16 for engaging and calipering of inside and outside work surfaces to be measured. The surfaces 49 and 50 may be conveniently provided by a pin 51 secured to and projecting from the opposite sides of caliper end 16 in coaxial alignment with pin 18.

Cooperating with the displaceable work feeler element 18 is the indicator means 19 for showing the precise displacement of element 18 in either direction, depending upon the character of the measurements being taken. As may best be seen in Figure 1, the indicator means 19 here provided in the form of an elongated pointer hand 55 which is pivotally mounted on the arm 12 by means of a screw 52 and which is engaged and displaced by a needle member 53 secured to the work feeler pin 18. A slot 54 (see Figure 5) is formed in the caliper arm end 14 for receiving the member 53 and permitting its movement relative to the arm with the pin 18. Also forming part of the indicator means 19 is a scale 56 which is cooperative with the pointer hand 55 for indicating the exact distance of relative displacement of the work feeler element 18. As here shown, the scale is formed with a central zero point so that when the hand 55 is displaced to the zero point in taking either inside or outside dimensions, the element 18 will be in exactly the same position relative to the arm end 14. For convenience in manufacturing and in maintaining the precise relationship required between the parts of the indicator means, the scale 56 is preferably inscribed upon, and the pivot screw 52 is engaged in, a flat mounting plate 57 which is, in turn, secured to the arm 12 by any suitable means such as screws 58.

As an important feature of the present invention, the aforesaid displacement of the work feeler element 18, relative to its supporting arm end 14, is yieldably resisted in order to provide a constant contact pressure of the feeler faces 47 or 48 against the work being measured to entirely eliminate any dependence upon the tactile sense of the user in determining the contact pressure. In this manner the device may be easily and quickly used to give a precise reading every time by merely operating until the hand 55 moves to zero on the scale 56, and it is not necessary for the user to try to judge the contact pressure by means of the feel of the relative resistance of the thimble 32 to rotation. As here shown, the resistance to the relative displacement of the work feeler element 18 is provided by a spring means 61 which engages the hand 55 and arm 12 to yieldably resist displacement of the hand over the arm, such resistance, of course, also acting to resist displacement of the element 18 by the nature of the connection of the element to the arm 55 through the part 53.

Means is provided for selectively reversing the bias of the spring means 61 in order to resist relative displacement of the work feeler element 18 in opposite directions for either inside or outside measurements as desired. As here shown, the spring 61 is provided in the form of a length of spring wire, secured at its opposite ends to the hand 55 adjacent the pivot screw 52 and to a pin 62 spaced from the pivot screw 52 and journalled for rotation between stops in the mounting plate 57.

Rotation of the pin 62 to its stop in a clockwise direction will bias spring 61 to urge hand 55 to the left of the scale 56, as shown in Figure 1, and, contrariwise, rotation of the pin 62 in a counterclockwise direction to its stop will bias spring 61 (to the position shown in phantom lines) to urge hand 55 to the right end of its scale. Rotation of the pin 62, as described, may be conveniently effected by a thumb wheel 63 secured to the pin.

As a feature of the present invention, the instrument is adapted to measure dimensions several times greater than the maximum travel of the arm 12 as provided by the micrometer vernier means 17. This is accomplished by extending the guide rods 21 and 22 the required distance and providing interfitting pin and notch means 71 for locking or keying the arm 13 to the guide rods at precisely spaced longitudinal positions along the guide rods. As may thus be seen in Figures 1, 3 and 4 of the drawings, the locking means 71 includes a plurality of longitudinally spaced notches 72 and 73 formed in the guide rods, preferably in the confronting faces thereof, and a pair of pins 74 and 76 journalled through the arm 13 and arranged for engagement with confronting pairs of notches 72 and 73 so as to precisely position the arm 13 on the guide ways. With reference to Figure 4 of the drawing, it will be seen that the pins 74 and 76 are preferably of slightly tapered form for securely holding the parts together in precise relationship and with a self-aligning action when the pins are pressed into place. With this construction, normal wear of the pins and notches will not affect the precision of setting of the arm 13 along the guide way. Withdrawal of the tapered pins to permit sliding movement of the arm along the guide ways is facilitated in the present construction by the provision on the pins of threaded nut members 77 and 78 which, upon appropriate rotation, engage the face of the arm to lift out the pins. Preferably, in order to prevent separation of the pins when withdrawn from the notches, the pins may be connected, as here shown, by a plate 82 holding the pins and nuts in a unitary assembly.

Preferably the notches are spaced by integer distances such as one inch, thereby cooperating with a one inch vernier scale on the micrometer head to provide direct reading without calculations. Also, and in order to facilitate direct reading of inside dimensions, the feeler pins 18 and 51 preferably add up in their length to one inch.

The micrometer caliper of the present invention, and as above described, is particularly adapted for use as a depth measuring gauge with the guide rods 21 and 22 and the end mounting block 24 cooperating with a depth feeler gauge rod 86 secured to the arm 12 and extending therefrom in parallel spaced relation between the guide rods and being journalled in aligned bores 83 and 84 in the stationary arm 13 and end block 24 and projecting past the end face 87 of the mounting block 24. In gauging the depth of holes, the face 87 is pressed against the work across the hole and the micrometer vernier means is rotated to advance the depth gauge rod 86 into the hole until the end face 88 of the gauge rod contacts the bottom of the hole. Since the arm 12 moves through a limited distance as determined by the micrometer vernier means 17, it is desirable to provide a plurality of interchangeable rods of varying lengths in order to measure holes of different depth. As here shown, quick detaching and replacement of the gauge rods is provided by threading the end of the rods for screwing into a nut member 89, which is fastened to the arm 12 by means of screws 91. An advantage provided by the present depth micrometer is in the precise advancing of the feeler rod into the hole being measured without rotation of the rod. This is effected since depth gauge rod 86 is not connected to the micrometer stem 33 directly but is instead secured to the arm 12, which is moved by the micrometer stem, and hence the rod 86 will not rotate as it is advanced. A direct reading of the depth of the hole may be effected with the micrometer head 17 here shown by providing a reverse numbering of the calibrations 36 on the barrel 31 in any suitable manner such as inscribing them on the opposite side of the barrel from that shown.

A modified form of the invention is illustrated in Figure 6, wherein the micrometer is particularly designed for measuring inside dimensions of less than one inch. In this form of the invention the guide way is provided by guide rods 21a and 22a, which are secured in parallel spaced relation to each other by fixedly securing to the stationary arm 13a. The opposite movable arm 12a is slidable upon the rods, as in the preferred embodiment, and is so moved by an elongated micrometer screw 93 journalled for rotation in a bore 92 provided through the arm 12a and having an end portion 96 threaded through the stationary arm 13a. A manually engageable knob 97 is mounted on the opposite end 98 of the screw and provides a shoulder 99 for engagement with and displacement of a side 101 of the arm 12a. A helical spring 102 positioned around the screw 93 and compressed between the arm 13a and the opposite side 103 of the arm 12a functions to constantly urge the arm 12a into engagement with the shoulder 99 with an unvarying pressure for all measurements upon displacement of the arm by the micrometer screw.

A work feeler element 18a is mounted for relative displacement on the outer end 14a of the arm 12a so as to cooperate with an opposite end 16a of arm 13a to take inside measurements against faces 47a and 49a provided on the feelers 18a and 16a respectively. In this form of the invention, the feeler member 18a is pivotally mounted to the arm end 14a by a pivot pin 104 and has an integrally connected pointer end 106 which cooperates with a scale 107 provided on the arm 12a to indicate the position of the feeler member 18a. A spring 108 is connected to the hand 106 of arm 12a for constantly urging the feeler member 18a in a clockwise direction against a stop provided by the arm end 14a. In this manner displacement of the feeler element 18a in a counterclockwise direction by the work in taking an inside measurement will be reflected in the displacement of the hand of 106 so that the normally required feel or touch of the operator is eliminated as in the preferred embodiment. The relative spacing of the faces 47a and 49a may be read directly from suitable calibrations provided on the guide rod 21a and on the knob 97 which cooperate with a face 109 on the arm 12a, and a vernier scale 111 on the knob 98 which cooperates with an index mark 112 on the arm.

In both the preferred and modified forms of the invention, the normally required sense of feel or touch of the operator, in order to obtain exact measurements, is completely eliminated by the provision of the resiliently displaceable feeler element and the indicating hand therefor which may be always brought to a zero or other constant position against the work. In the use of the instruments, therefore, to measure work, both inside and outside dimensions in the case of the preferred embodiment, the work engaging faces of the instrument are brought into contact with the work by rotation of the micrometer means and such rotation is continued until the indicator hand is zeroed. At this point the dimension of the part may be read with complete accuracy on the scales of the micrometer head.

In addition to the foregoing, the instruments of both the preferred and modified forms may be used as a standard gauge for a plurality of parts. In such case the micrometer head of the instrument is set to the standard measurement. The part to be measured may then be inserted between or against the measuring faces of the instrument, whereupon the variation from standard of the part will be immediately shown by and may be directly read from the indicator means.

I claim:

1. A micrometer caliper comprising, a frame composed of a pair of guide rods and a mounting block therefor securing said guide rods in spaced parallel relation, first and second caliper arms slidably mounted on said guide rods and projecting laterally therefrom to provide outstanding caliper ends for engagement with the work to be measured, said rods being formed with a plurality of longitudinally spaced notches with transversely adjacent notches defining a longitudinal position for said first arm, a pair of tapered pins mounted for movement in said first caliper arm engageable with each pair of transversely adjacent notches for locking said first caliper arm in each said position, manually engageable nut means threadably engaged with said pins for withdrawing the latter from engagement with said notches, and micrometer vernier means carried by said block and connected to said second caliper arm for indicating the relative distance between said caliper arm ends.

2. A micrometer caliper comprising, an elongated guideway, caliper arms mounted on said guideway and for relative movement thereon for engagement with the work to be measured, micrometer vernier means carried by said guideway and having a relatively movable member abutting one of said arms for effecting displacement thereof along said guideway and relative to said other arm and indicating the relative distance between said arms, and resiliently yieldable spring means having one end connected to and movable with said micrometer member and its opposite end connected to said abutting arm for holding the latter in constant engagement with said member with uniform pressure throughout the range of said displacement.

3. A micrometer caliper comprising, an elongated guideway, caliper arms mounted for movement on said guideway for engagement with the work to be measured, means for locking one of said arms to said guideway at precise longitudinal positions therealong, micrometer vernier means carried by said guideway and having a relatively movable member connected to the other of said arms for effecting displacement thereof along said guideway and relative to said other arm and indicating the relative distance between said arms, and resilient yieldable spring means connected to said micrometer member and said connected arm for holding the latter in constant engagement with said member and with uniform pressure throughout the range of said displacement.

4. A micrometer caliper comprising, a frame composed of a pair of parallel guide rods and a mounting block therefor, first and second caliper arms slidably mounted on said rods, means for locking said first arm to said rods in selected longitudinal position therealong, rotary micrometer vernier means having a part secured to said block and a relatively movable part including a stem extending parallel to said guide rods and into engagement with a side of said second arm for effecting displacement thereof along said rods and relative to said first arm and indicating the relative distance between said arms, said second arm being formed with a chamber opening to said side thereof, and a spring mounted in said chamber and connected to said stem and said second arm for holding said stem and second arm in constant engagement with uniform pressure throughout the range of said displacement.

References Cited in the file of this patent

UNITED STATES PATENTS

| | | |
|---|---|---|
| 883,660 | Marr | Mar. 31, 1908 |
| 1,282,030 | Benemelis | Oct. 22, 1918 |
| 1,329,911 | Lenti | Feb. 3, 1920 |
| 1,355,724 | Zhukoff | Oct. 12, 1920 |
| 1,425,027 | Lustrik | Aug. 8, 1922 |
| 1,459,500 | Cady | June 19, 1923 |
| 1,956,871 | Mayman | May 1, 1934 |
| 2,129,311 | Street | Sept. 6, 1938 |
| 2,517,846 | Craig | Aug. 8, 1950 |
| 2,520,022 | Vobeda | Aug. 22, 1950 |

FOREIGN PATENTS

| | | |
|---|---|---|
| 767,054 | France | Apr. 23, 1934 |
| 632,671 | Great Britain | Nov. 28, 1949 |